US008952098B2

(12) United States Patent
Mabuchi

(10) Patent No.: US 8,952,098 B2
(45) Date of Patent: Feb. 10, 2015

(54) RUBBER COMPOSITION FOR SIDEWALL OR BASE TREAD, AND PNEUMATIC TIRE

(71) Applicant: Sumitomo Rubber Industries, Ltd., Kobe-shi, Hyogo (JP)

(72) Inventor: Takahiro Mabuchi, Kobe (JP)

(73) Assignee: Sumitomo Rubber Industries, Ltd., Kobe (JP)

( * ) Notice: Subject to any disclaimer, the term of this patent is extended or adjusted under 35 U.S.C. 154(b) by 0 days.

(21) Appl. No.: 14/088,642

(22) Filed: Nov. 25, 2013

(65) Prior Publication Data

US 2014/0163172 A1 Jun. 12, 2014

(30) Foreign Application Priority Data

Dec. 12, 2012 (JP) ................................ 2012-271471

(51) Int. Cl.

| | |
|---|---|
| ***C08L 7/00*** | (2006.01) |
| ***C08L 9/00*** | (2006.01) |
| ***C08L 15/00*** | (2006.01) |
| ***C08L 93/00*** | (2006.01) |
| ***B60C 1/00*** | (2006.01) |

(52) U.S. Cl.

CPC ... *C08L 9/00* (2013.01); *C08L 7/00* (2013.01); *C08L 93/00* (2013.01); *B60C 1/0016* (2013.01); *Y02T 10/862* (2013.01); *B60C 1/0025* (2013.01)

USPC .......................................... 525/236; 525/237

(58) Field of Classification Search

CPC ............ C08L 7/00; C08L 9/00; C08L 15/00; C08L 47/00; C08L 57/00; B60D 1/00; B60C 11/00

USPC ................................................. 525/236, 237

See application file for complete search history.

(56) References Cited

U.S. PATENT DOCUMENTS

| | | | | |
|---|---|---|---|---|
| 5,955,531 | A * | 9/1999 | Futamura ...................... | 524/495 |
| 7,371,791 | B2 * | 5/2008 | Hattori et al. ................ | 524/274 |

FOREIGN PATENT DOCUMENTS

| | | |
|---|---|---|
| JP | 2003-64222 A | 3/2003 |

* cited by examiner

*Primary Examiner* — Nathan M Nutter

(74) *Attorney, Agent, or Firm* — Birch, Stewart, Kolasch & Birch, LLP

(57) ABSTRACT

The present invention provides a rubber composition for a sidewall or base tread, which offers good flex crack growth resistance, crack initiation resistance, durability, and fuel economy despite the use of a softener derived from non-petroleum resources; and also provides a pneumatic tire formed from the rubber composition. The present invention relates to a rubber composition for a sidewall or base tread, containing a rubber component including at least two kinds of diene rubbers, and a myrcene polymer, wherein the rubber component includes at least one kind of diene rubber selected from the group consisting of natural rubber, epoxidized natural rubber, and butadiene rubber, and the myrcene polymer has a weight average molecular weight of 1000 to 500000.

5 Claims, No Drawings

RUBBER COMPOSITION FOR SIDEWALL OR BASE TREAD, AND PNEUMATIC TIRE

TECHNICAL FIELD

The present invention relates to a rubber composition for a sidewall or base tread, and a pneumatic tire formed from the same.

BACKGROUND ART

In recent years, environmental issues have gained increasing significance, and $CO_2$ emission controls have been tightened. Meanwhile, petroleum resources are limited, which may lead to difficulties in the supply of raw materials derived from petroleum resources in the future. In addition, petroleum prices are expected to soar due to a decrease in the supply every year. This creates a demand to replace raw materials derived from petroleum resources with raw materials derived from non-petroleum resources.

Conventionally, rubber compositions for tires generally contain aromatic oils as softeners. However, aromatic oils need to be replaced due to their carcinogenic properties and other problems. Today, tire companies in Japan are beginning to take measures to replace aromatic oils with various oils derived from petroleum resources (alternative aromatic oils) having a structure similar to that of aromatic oils.

However, alternative aromatic oils still depend on petroleum resources. Additionally, the addition of oil derived from petroleum resources in a rubber composition particularly containing natural rubber or butadiene rubber tends to increase rolling resistance of a tire (or deteriorate the performance in terms of rolling resistance) and increase fuel consumption (or deteriorate fuel economy). Moreover, whether aromatic oils or alternative aromatic oils are added, rubber compositions particularly containing natural rubber or butadiene rubber still leave room for improvement in terms of filler dispersibility as well as flex crack growth resistance and durability when used in sidewalls or base treads.

In this regard, for example, Patent Literature 1 discloses a rubber composition containing a vegetable oil (e.g. palm oil) which is used as a softener derived from non-petroleum resources to replace oil derived from petroleum resources. This rubber composition is excellent in terms of contribution to environmental friendliness but is very poor in filler dispersibility as well as in flex crack growth resistance and durability when used in sidewalls, compared with rubber compositions containing aromatic oils. As described above, a problem associated with the use of softeners derived from non-petroleum resources is that the flex crack growth resistance and durability provided by the addition of such softeners are merely equivalent to or less than those when conventional softeners derived from petroleum resources are added.

CITATION LIST

Patent Literature

Patent Literature 1: JP-A 2003-64222

SUMMARY OF INVENTION

Technical Problem

The present invention aims to solve the above problems and provide a rubber composition for a sidewall or base tread, which offers good flex crack growth resistance, crack initiation resistance, durability, and fuel economy despite the use of a softener derived from non-petroleum resources; and a pneumatic tire formed from the rubber composition.

Solution to Problem

The present invention relates to a rubber composition for a sidewall or base tread, containing: a rubber component including at least two kinds of diene rubbers; and a myrcene polymer, wherein the rubber component includes at least one kind of diene rubber selected from the group consisting of natural rubber, epoxidized natural rubber, and butadiene rubber, and the myrcene polymer has a weight average molecular weight of 1000 to 500000.

A combined amount of natural rubber and butadiene rubber is preferably 50% by mass or more based on 100% by mass of the rubber component.

A combined amount of natural rubber and epoxidized natural rubber is preferably 30% by mass or more based on 100% by mass of the rubber component.

An amount of total softener including the myrcene polymer is preferably 1 to 30 parts by mass per 100 parts by mass of the rubber component.

The present invention also relates to a pneumatic tire, including at least one of a sidewall and a base tread which are formed from the rubber composition.

Advantageous Effects of Invention

The rubber composition for a sidewall or base tread of the present invention contains a rubber component including at least two kinds of diene rubbers, and a myrcene polymer, wherein the rubber component includes at least one kind of diene rubber selected from the group consisting of natural rubber, epoxidized natural rubber, and butadiene rubber, and the myrcene polymer has a weight average molecular weight of 1000 to 500000. Accordingly, the rubber composition of the present invention provides good flex crack growth resistance, crack initiation resistance, durability, and fuel economy despite the use of the softener derived from non-petroleum resources, and the present invention thus can provide a pneumatic tire having excellent flex crack growth resistance, crack initiation resistance, durability, and fuel economy. Further, the use of the softener derived from non-petroleum resources makes a contribution to environmental friendliness, can be a preparation for a future reduction in petroleum supply, and makes it possible to provide a pneumatic tire having the excellent properties even under such a situation.

DESCRIPTION OF EMBODIMENTS

The rubber composition for a sidewall or base tread of the present invention contains a rubber component including at least two kinds of diene rubbers, and a myrcene polymer. The rubber component includes at least one kind of diene rubber selected from the group consisting of natural rubber, epoxidized natural rubber, and butadiene rubber, and the myrcene polymer has a weight average molecular weight of 1000 to 500000.

The rubber composition of the present invention contains at least two kinds of diene rubbers as the rubber component, and at least one of the diene rubbers is any one of natural rubber, epoxidized natural rubber, and butadiene rubber. Such a rubber composition offers flex crack growth resistance and durability required of a rubber composition for a sidewall and of a rubber composition for a base tread.

Further, a myrcene polymer having a specific molecular weight is used as a softener derived from non-petroleum resources, in combination with the rubber component mentioned above. This improves flex crack growth resistance, durability, and fuel economy while maintaining good crack initiation resistance. In other words, even when the myrcene polymer is used in a rubber composition containing any one of natural rubber, epoxidized natural rubber, and butadiene rubber, it is possible to improve flex crack growth resistance, durability, and fuel economy while maintaining good crack initiation resistance. Further, even when the myrcene polymer is used in a rubber composition containing natural rubber and butadiene rubber, it is possible to improve flex crack growth resistance, durability, and fuel economy while maintaining good crack initiation resistance. In addition, the present invention contributes to environmental friendliness and can be a preparation for a future reduction in petroleum supply.

In the present invention, the rubber component includes at least two kinds of diene rubbers, including at least one kind of diene rubber selected from the group consisting of natural rubber (NR), epoxidized natural rubber (ENR), and butadiene rubber (BR). This provides good flex crack growth resistance, crack initiation resistance, durability, and fuel economy.

NR is preferred among the NR, ENR, and BR. Further, in the case of a rubber composition for a sidewall, it is more preferred to use a combination of NR and ENR or a combination of NR and BR. In the case of a rubber composition for a base tread, it is more preferred to use a combination of NR and BR or a combination of NR and ENR.

Examples of the NR include SIR20, RSS#3, TSR20, and other products commonly used in the tire industry. Deproteinized natural rubber (DPNR) may also be used as the NR.

The amount of NR, based on 100% by mass of the rubber component, is preferably 20% by mass or more, and more preferably 30% by mass or more. An amount of less than 20% by mass may not lead to sufficient flex crack growth resistance, crack initiation resistance, durability, and fuel economy. With such an amount, the contribution to environmental friendliness may also be insufficient, and it may be impossible to prepare for a future reduction in petroleum supply. The amount of NR is preferably 80% by mass or less, more preferably 70% by mass or less, still more preferably 60% by mass or less, and particularly preferably 50% by mass or less. An amount of more than 80% by mass may not lead to sufficient flex crack growth resistance, crack initiation resistance, durability, and fuel economy.

Commercially available ENR may be used. Or, NR may be epoxidized and used as ENR. The use of ENR further improves flex crack growth resistance, durability, and fuel economy. NR may be epoxidized by any method, such as a chlorohydrin method, direct oxidation method, hydrogen peroxide method, alkyl hydroperoxide method, or peracid method. The peracid method may be, for example, a method in which an emulsion of natural rubber is reacted with an organic peracid such as peracetic acid or performic acid as the epoxidation agent.

The ENR preferably has a degree of epoxidation of 5 mol % or more, more preferably 10 mol % or more, and still more preferably 15 mol % or more. If the degree of epoxidation is lower than 5 mol %, such an epoxidation may only produce a small effect, and such ENR may be too compatible with NR when blended therewith. As a result, the ENR may be less likely to improve flex crack growth resistance and to exhibit the effect of improving ozone resistance. Also, the degree of epoxidation of epoxidized natural rubber (ENR) is preferably 60 mol % or less, more preferably 40 mol % or less, and still more preferably 30 mol % or less. ENR having a degree of epoxidation of more than 60 mol % may deteriorate fuel economy, and may have extremely poor processability when blended with NR, leading to poor durability.

The term "degree of epoxidation" as used herein refers to a ratio of the number of epoxidized carbon-carbon double bonds to the total number of carbon-carbon double bonds in natural rubber before epoxidation. The degree of epoxidation can be determined, for example, by an analysis method such as a titration analysis or nuclear magnetic resonance (NMR) analysis.

The amount of ENR, based on 100% by mass of the rubber component, is preferably 20% by mass or more, and more preferably 30% by mass or more. An amount of less than 20% by mass may not lead to sufficient flex crack growth resistance, crack initiation resistance, durability, and fuel economy. With such an amount, the contribution to environmental friendliness may also be insufficient, and it may be impossible to prepare for a future reduction in petroleum supply. The amount of ENR is preferably 60% by mass or less, and more preferably 50% by mass or less. An amount of more than 60% by mass may not lead to sufficient flex crack growth resistance, crack initiation resistance, durability, and fuel economy.

The combined amount of NR and ENR, based on 100% by mass of the rubber component, is preferably 20% by mass or more, and more preferably 30% by mass or more. An amount of less than 20% by mass may not lead to sufficient flex crack growth resistance, crack initiation resistance, durability, and fuel economy. With such an amount, the contribution to environmental friendliness may also be insufficient, and it may be impossible to prepare for a future reduction in petroleum supply. The combined amount is preferably 80% by mass or less, more preferably 70% by mass or less, still more preferably 60% by mass or less, and particularly preferably 50% by mass or less. An amount of more than 80% by mass may not lead to sufficient flex crack growth resistance, crack initiation resistance, durability, and fuel economy.

Any BR may be used. Examples thereof include those commonly used in the tire industry, such as BR having a high cis content (e.g., BR1220 available from ZEON CORPORATION and BR150B available from Ube Industries, Ltd.) and BR containing 1,2-syndiotactic polybutadiene crystals (SPB) (e.g., VCR412 and VCR617 available from Ube Industries, Ltd.). Among these, BR having a cis content of 95% by mass or more is preferred for its excellent flex crack growth resistance and durability.

The amount of BR, based on 100% by mass of the rubber component, is preferably 20% by mass or more, more preferably 30% by mass or more, still more preferably 40% by mass or more, and particularly preferably 50% by mass or more. An amount of less than 20% by mass may not lead to sufficient flex crack growth resistance, crack initiation resistance, durability, and fuel economy. The amount of BR is preferably 80% by mass or less, and more preferably 70% by mass or less. An amount of more than 80% by mass may rather deteriorate flex crack growth resistance and may not ensure sufficient mechanical strength.

The combined amount of NR and BR, based on 100% by mass of the rubber component, is preferably 50% by mass or more, more preferably 75% by mass or more, and still more preferably 90% by mass or more. It may also be 100% by mass. An amount of less than 50% by mass may not lead to sufficient flex crack growth resistance, crack initiation resistance, durability, and fuel economy, and in particular sufficient flex crack growth resistance and durability.

Examples of rubber materials other than NR, ENR, and BR which can be used in the present invention include various kinds of diene rubbers such as isoprene rubber (IR), styrene butadiene rubber (SBR), styrene-isoprene-butadiene rubber (SIBR), chloroprene rubber (CR), and acrylonitrile-butadiene rubber (NBR).

The present invention uses a myrcene polymer. The myrcene polymer refers to a polymer obtained by polymerization of myrcene as the monomer component. Myrcene herein is a naturally occurring organic compound and is a type of olefin belonging to monoterpene. Myrcene has two isomers: α-myrcene (2-methyl-6-methyleneocta-1,7-diene) and β-myrcene (7-methyl-3-methyleneocta-1,6-diene). In the present invention, the simple term "myrcene" refers to β-myrcene (the compound having the following structure).

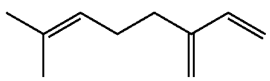

In the present invention, a myrcene polymer having a specific molecular weight is used as a softener derived from non-petroleum resources, in combination with the rubber component mentioned above. This improves flex crack growth resistance, durability, and fuel economy while maintaining good crack initiation resistance. Moreover, since myrcene as the monomer component is a naturally occurring organic compound, the use of a myrcene polymer obtained by polymerization of the myrcene can provide the following effects: a reduction in the amount of use of raw materials derived from petroleum resources; a contribution to environmental friendliness; and a preparation for a future reduction in petroleum supply. The myrcene polymer is preferably used in place of a softener (e.g. oil) that has conventionally been used in a sidewall rubber or base tread rubber. In this case, the amount of use of raw materials derived from petroleum resources can be further reduced, and the effects of the present invention can also be more suitably achieved.

The weight average molecular weight (Mw) of the myrcene polymer is not particularly limited as long as it is 1000 or more. It is preferably 2000 or more, and more preferably 3000 or more. The myrcene polymer having an Mw of less than 1000 leads to poor flex crack growth resistance, durability, crack initiation resistance, and fuel economy, and in particular poor flex crack growth resistance and durability. The Mw is not particularly limited as long as it is 500000 or less. It is preferably 300000 or less, more preferably 150000 or less, and particularly preferably 100000 or less. The myrcene polymer having an Mw of more than 500000 leads to poor flex crack growth resistance, durability, crack initiation resistance, and fuel economy, and in particular poor flex crack growth resistance, durability, and crack initiation resistance. The myrcene polymer having an Mw in the range mentioned above can be suitably used as a softener, and the effects of the present invention can be more suitably achieved.

The weight average molecular weight (Mw) as used herein is determined by a method described in the examples.

The myrcene polymer is obtained by polymerization of myrcene as the monomer component.

Procedures for the polymerization are not particularly limited. For example, all monomers may be polymerized at once, or monomers may be gradually added and polymerized. The monomer component may also include a monomer other than myrcene. The myrcene content, based on 100% by mass of the monomer component, is preferably 80% by mass or more, and more preferably 90% by mass or more. It may also be 100% by mass.

The polymerization can be carried out by an ordinary technique such as anionic polymerization and coordination polymerization.

Any polymerization method such as solution polymerization, emulsion polymerization, vapor phase polymerization, or bulk polymerization can be used. Among these, the solution polymerization method is preferred. The polymerization may be carried out in either a batch or continuous mode.

Hereinafter, a method for preparing the myrcene polymer by anionic polymerization and a method for preparing the myrcene polymer by coordination polymerization are described.

<Anionic Polymerization>

The anionic polymerization can be performed in an appropriate solvent in the presence of an anionic polymerization initiator. Any conventional anionic polymerization initiator can be suitably used. Examples of such anionic polymerization initiators include organic lithium compounds having the formula RLix wherein R is an aliphatic, aromatic, or alicyclic group having one or more carbon atoms; and x is an integer of 1 to 20. Examples of appropriate organic lithium compounds include methyllithium, ethyllithium, n-butyllithium, sec-butyllithium, tert-butyllithium, phenyllithium, and naphtyllithium. Preferred organic lithium compounds are n-butyllithium and sec-butyllithium. Anionic polymerization initiators can be used alone or in admixture of two or more. The polymerization initiator for anionic polymerization may be used in any amount. For example, the amount is preferably about 0.05 to 35 mmol, and more preferably about 0.05 to 0.2 mmol, per 100 g of total monomers used in the polymerization.

Moreover, any solvent that does not deactivate the anionic polymerization initiator and does not terminate the polymerization reaction can be suitably used in the anionic polymerization. Both polar and non-polar solvents can be used. Examples of polar solvents include ether solvents such as tetrahydrofuran, and examples of non-polar solvents include acyclic hydrocarbons such as hexane, heptane, octane, and pentane; cyclic hydrocarbons such as cyclohexane; and aromatic hydrocarbons such as benzene, toluene, and xylene. These solvents may be used alone or in admixture of two or more.

Moreover, the anionic polymerization is preferably performed in the presence of a polar compound. Examples of such polar compounds include dimethyl ether, diethyl ether, ethyl methyl ether, ethyl propyl ether, tetrahydrofuran, dioxane, diphenyl ether, tripropylamine, tributylamine, trimethylamine, triethylamine, and N,N,N',N'-tetramethylethylenediamine (TMEDA). These polar compounds may be used alone or in admixture of two or more. Such a polar compound is useful in controlling the microstructure of a polymer. Although the amount of the polar compound used varies depending on the type of the polar compound and the polymerization conditions, the molar ratio of the polar compound to the anionic polymerization initiator (polar compound/anionic polymerization initiator) is preferably 0.1 or more. If the molar ratio of the polar compound to the anionic polymerization initiator (polar compound/anionic polymerization initiator) is less than 0.1, the effect of the polar material on controlling the microstructure tends to be insufficient.

The reaction temperature during the anionic polymerization is not particularly limited as long as the reaction proceeds suitably. In general, the reaction temperature is preferably −10° C. to 100° C., and more preferably 25° C. to 70° C.

Although the reaction time varies depending on the amount of materials charged, the reaction temperature, and other conditions, about three hours of reaction, for example, is typically sufficient.

The anionic polymerization can be terminated by adding a reaction terminator commonly used in this field. Examples of such reaction terminators include polar solvents containing an active proton, such as alcohols including methanol, ethanol, and isopropanol, and acetic acid; and mixtures of these polar solvents; and mixtures of these polar solvents with non-polar solvents such as hexane and cyclohexane. Typically, it is sufficient to add the reaction terminator in approximately an equimolar to approximately two-fold molar amount relative to the anionic polymerization initiator.

After termination of the polymerization reaction, the myrcene polymer can be easily isolated by removing the solvent from the polymerization solution by an ordinary method or by pouring the polymerization solution into the same amount or more of alcohol to precipitate the myrcene polymer.

<Coordination Polymerization>

The coordination polymerization can be performed by the use of a coordination polymerization initiator instead of the anionic polymerization initiator used in the anionic polymerization. Any conventional coordination polymerization initiator can be suitably used. Examples of such coordination polymerization initiators include catalysts containing transition metal-containing compounds such as lanthanoid compounds, titanium compounds, cobalt compounds, and nickel compounds. Aluminum compounds or boron compounds may also be used as promoters, if desired.

Any lanthanoid compound that contains any of the elements of atomic number from 57 to 71 (lanthanoids) can be used. Among these lanthanoids, neodymium is particularly preferred. Examples of lanthanoid compounds include carboxylates, β-diketone complexes, alkoxides, phosphates, phosphites, or halides of these elements. Among these, carboxylates, alkoxides, and β-diketone complexes are preferred for their easy handling. Examples of titanium compounds include titanium-containing compounds that contain one cyclopentadienyl, indenyl, substituted cyclopentadienyl, or substituted indenyl group and also contain three substituents selected from halogen atoms, alkoxy groups, and alkyl groups. Among these, compounds containing one alkoxysilyl group are preferred in terms of catalytic performance. Examples of cobalt compounds include halides, carboxylates, β-diketone complexes, organic base complexes, or organic phosphine complexes of cobalt. Examples of nickel compounds include halides, carboxylates, β-diketone complexes, or organic base complexes of nickel. Catalysts usable as the coordination polymerization initiator may be used alone or in combinations of two or more. The catalyst as the polymerization initiator for coordination polymerization may be used in any amount. The amount is, for example, preferably in the same range as described for the anionic polymerization.

Examples of aluminum compounds used as promoters include organic aluminoxanes, organoaluminum halides, organoaluminum compounds, and organoaluminum hydrides. Examples of organic aluminoxanes include alkylaluminoxanes (e.g., methylaluminoxane, ethylaluminoxane, propylaluminoxane, butylaluminoxane, isobutylaluminoxane, octylaluminoxane, and hexylaluminoxane). Examples of organoaluminum halides include alkylaluminum halides (e.g., dimethylaluminum chloride, diethylaluminum chloride, methylaluminum dichloride, and ethylaluminum dichloride). Examples of organoaluminum compounds include alkylaluminum compounds (e.g., trimethylaluminum, triethylaluminum, triisopropylaluminum, and triisobutylaluminum). Examples of organoaluminum hydrides include alkylaluminum hydrides (e.g., diethylaluminum hydride and diisobutylaluminum hydride). Examples of boron compounds include compounds containing anionic species, such as tetraphenylborate, tetrakis(pentafluorophenyl)borate and (3,5-bistrifluoromethylphenyl)borate. These promoters may also be used alone or in combinations of two or more.

The coordination polymerization can be performed using a solvent and polar compound mentioned in the anionic polymerization, in a similar manner as described for the anionic polymerization. The reaction time and reaction temperature are also the same as described for the anionic polymerization. The termination of the polymerization reaction and the isolation of the myrcene polymer can also be performed in similar manners as described in the anionic polymerization.

The weight average molecular weight (Mw) of the myrcene polymer can be controlled by adjusting the amount of myrcene monomer and the amount of the polymerization initiator charged in the polymerization. For example, an increase in the ratio of total monomer to anionic polymerization initiator or an increase in the ratio of total monomer to coordination polymerization initiator can increase the Mw. Conversely, a decrease in such a ratio can decrease the Mw. The number average molecular weight (Mn) of the myrcene polymer can also be controlled in a similar manner.

The myrcene polymer is preferably contained in an amount of 1 part by mass or more, more preferably 3 parts by mass or more, and still more preferably 5 parts by mass or more, per 100 parts by mass of the rubber component. An amount of less than 1 part by mass tends to fail to improve flex crack growth resistance, durability, and fuel economy while maintaining good crack initiation resistance. The amount of the myrcene polymer is preferably 50 parts by mass or less, more preferably 30 parts by mass or less, and still more preferably 15 parts by mass or less. An amount of more than 50 parts by mass tends to decrease fuel economy.

In the present invention, a softener other than the myrcene polymer may be added. Examples of such softeners include process oils, vegetable oils, and resins. Examples of process oils include paraffinic process oil, naphthenic process oil, and aromatic process oil. Examples of vegetable oils include castor oil, cottonseed oil, linseed oil, rapeseed oil, soybean oil, palm oil, coconut oil, peanut oil, rosin, pine oil, pine tar, tall oil, corn oil, rice oil, safflower oil, sesame oil, olive oil, sunflower oil, palm kernel oil, camellia oil, jojoba oil, macadamia nut oil, and tung oil. Examples of resins include petroleum resins, coumarone-indene resins, and terpene resins. The amount of total softener (including the myrcene polymer) is preferably 1 to 50 parts by mass, more preferably 3 to 30 parts by mass, and still more preferably 5 to 15 parts by mass, per 100 parts by mass of the rubber component.

As described above, in the present invention, the myrcene polymer is preferably used to partially or entirely replace a softener (e.g. oil) that has conventionally been used in a sidewall rubber or base tread rubber. Thus, the amount of the myrcene polymer, based on 100% by mass of the softener component, is preferably 25% by mass or more, more preferably 50% by mass or more, and still more preferably 80% by mass or more. It may also be 100% by mass. In such cases, the effects of the present invention can be more suitably achieved.

The rubber composition of the present invention preferably contains carbon black. The use of carbon black in combination with the rubber component and the myrcene polymer mentioned above can further improve durability, mechanical strength, resistance to degradation by UV light, flex crack growth resistance, and crack initiation resistance, and in particular durability. Examples of the carbon black include SRF, GPF, FEF, HAF, ISAF, and SAF.

The carbon black preferably has a nitrogen adsorption specific surface area ($N_2SA$) of 20 $m^2/g$ or greater, more preferably 25 $m^2/g$ or greater, and still more preferably 35 $m^2/g$ or greater. The carbon black having an $N_2SA$ of smaller than 20 $m^2/g$ tends to provide insufficient reinforcement and thereby lead to insufficient durability, flex crack growth resistance, and crack initiation resistance. The $N_2SA$ of carbon black is preferably 75 $m^2/g$ or smaller, and more preferably 50 $m^2/g$ or smaller. The carbon black having an $N_2SA$ of greater than 75 $m^2/g$ tends to greatly increase the viscosity before vulcanization, deteriorating processability. Such a carbon black also tends to lead to poor fuel economy.

The $N_2SA$ of carbon black is determined in accordance with JIS K 6217-2:2001.

In the rubber composition of the present invention, the amount of carbon black, per 100 parts by mass of the rubber component, is preferably 3 parts by mass or more, more preferably 15 parts by mass or more, and still more preferably 30 parts by mass or more. An amount of less than 3 parts by mass may fail to provide sufficient reinforcement and resistance to degradation by UV light. With such an amount, other properties such as durability, mechanical strength, flex crack growth resistance, and crack initiation resistance may also be insufficient. The amount of carbon black, per 100 parts by mass of the rubber component, is preferably 100 parts by mass or less, and more preferably 70 parts by mass or less. An amount of more than 100 parts by mass tends to increase heat build-up and deteriorate fuel economy.

The rubber composition of the present invention preferably contains silica. The use of silica in combination with the rubber component and the myrcene polymer mentioned above can further improve fuel economy while providing good flex crack growth resistance and crack initiation resistance. It can also make a contribution to environmental friendliness and can be a preparation for a future reduction in petroleum supply. Examples of the silica include dry-process silica (anhydrous silica) and wet-process silica (hydrous silica). Of these, wet-process silica is preferred because it has many silanol groups.

The silica preferably has a nitrogen adsorption specific surface area ($N_2SA$) of 10 $m^2/g$ or greater, more preferably 50 $m^2/g$ or greater, still more preferably 100 $m^2/g$ greater, and particularly preferably 165 $m^2/g$ or greater. The silica having an $N_2SA$ of smaller than 10 $m^2/g$ may provide insufficient reinforcement and thus may not ensure mechanical strength required for use in a sidewall or base tread, which may result in insufficient durability. Also, the $N_2SA$ of silica is preferably 600 $m^2/g$ or smaller, more preferably 300 $m^2/g$ or smaller, still more preferably 260 $m^2/g$ or smaller, and particularly preferably 200 $m^2/g$ or smaller.

The silica having an $N_2SA$ of greater than 600 $m^2/g$ may have low dispersibility, deteriorating processability. Such a silica may also decrease fuel economy.

The $N_2SA$ of silica is a value determined by the BET method in accordance with ASTM D3037-81.

The amount of silica, per 100 parts by mass of the rubber component, is preferably 3 parts by mass or more, more preferably 5 parts by mass or more, still more preferably 10 parts by mass or more, particularly preferably 20 parts by mass or more, and most preferably 30 parts by mass or more. The silica in an amount of less than 3 parts by mass may not sufficiently exert its effects. The amount of silica is preferably 150 parts by mass or less, more preferably 120 parts by mass or less, still more preferably 100 parts by mass or less, and particularly preferably 70 parts by mass or less. The silica in an amount of more than 150 parts by mass may have low dispersibility, deteriorating processability. Such an amount may also decrease flex crack growth resistance and fuel economy.

The rubber composition preferably contains a silane coupling agent in combination with the silica.

Any silane coupling agent that has conventionally been used in combination with silica in the rubber industry can be used. Examples thereof include sulfide silane coupling agents such as bis(3-triethoxysilylpropyl)tetrasulfide, mercapto silane coupling agents such as 3-mercaptopropyltrimethoxysilane, vinyl silane coupling agents such as vinyltriethoxysilane, amino silane coupling agents such as 3-aminopropyltriethoxysilane, glycidoxy silane coupling agents such as γ-glycidoxypropyltriethoxysilane, nitro silane coupling agents such as 3-nitropropyltrimethoxysilane, and chloro silane coupling agents such as 3-chloropropyltrimethoxysilane. Among these, sulfide silane coupling agents are preferred, with bis(3-triethoxysilylpropyl)tetrasulfide being more preferred.

The amount of the silane coupling agent, per 100 parts by mass of silica, is preferably 2 parts by mass or more, and more preferably 5 parts by mass or more. The silane coupling agent in an amount of less than 2 parts by mass tends to fail to improve the dispersibility of silica and thus tends to result in a great decrease in durability. The amount of the silane coupling agent is preferably 15 parts by mass or less, and more preferably 10 parts by mass or less. The silane coupling agent in an amount of more than 15 parts by mass is unlikely to produce an effect proportional to the increase in the cost.

In the present invention, a silane compound is preferably contained in combination with the silica. The use of a silane compound can improve flex crack growth resistance, durability, and fuel economy, and in particular durability. Examples of such silane compounds include compounds represented by the following formula:

$$X_n\text{—Si—}Y_{4-n}$$

wherein X is a C1-C5 alkoxy group, Y is a phenyl or alkyl group, and n is an integer of 1 to 3.

In the formula, X is a C1-C5 alkoxy group. X is preferably a methoxy or ethoxy group because these groups have high reactivity with silica, and X is more preferably an ethoxy group because such a compound has a high flash point.

Y is a phenyl or alkyl group (preferably a C1-C10 alkyl group). In the case where Y is an alkyl group, for example, a methyl group (—$CH_3$), methyltriethoxysilane, for example, has a flash point of 8° C. Also when Y is a hexyl group (—$CH_2(CH_2)_4CH_3$) hexyltriethoxysilane, for example, has a flash point of 81° C. The flash point is low in these cases. On the other hand, when Y is a phenyl group, such a compound has a flash point as high as 111° C., and therefore is easy to handle. For this reason, a phenyl group is preferred.

Herein, n is an integer of 1 to 3. When n is 0, such a silane compound does not have an alkoxy group and is likely to be incapable of reacting with silica. Also, when n is 4, such a silane compound tends to be less compatible with rubber. For high reactivity with silica, n is preferably 3.

Examples of silane compounds that satisfy the above formula include methyltrimethoxysilane (e.g., KBM13 available from Shin-Etsu Chemical Co., Ltd.), dimethyldimethoxysilane (e.g., KBM22 available from Shin-Etsu Chemical Co., Ltd.), phenyltrimethoxysilane (e.g., KBM103 available from Shin-Etsu Chemical Co., Ltd.), diphenyldimethoxysilane (e.g., KBM202SS available from Shin-Etsu Chemical Co., Ltd.), methyltriethoxysilane (e.g., KBE13 available from Shin-Etsu Chemical Co., Ltd.), dimethyldiethoxysilane (e.g., KBE22 available from Shin-Etsu Chemical Co., Ltd.), phenyltriethoxysilane (e.g., KBE103 available from Shin-Etsu Chemical Co., Ltd.), diphenyldiethoxysilane (e.g., KBE202 available from Shin-Etsu Chemical Co., Ltd.), hexyltrimethoxysilane (e.g., KBM3063 available from Shin-Etsu Chemical Co., Ltd.), hexyltriethoxysilane (e.g., KBE3063 available from Shin-Etsu Chemical Co., Ltd.), and decyltrimethoxysilane (e.g., KBM3103 and KBM3103C available from Shin-Etsu Chemical Co., Ltd.). Among these, phenyltriethoxysilane and phenyltrimethoxysilane are preferred, with phenyltriethoxysilane being more preferred, because of their high reactivity with silica and high flash point.

The amount of the silane compound, per 100 parts by mass of silica, is preferably 4 parts by mass or more, and more preferably 6 parts by mass or more. The silane compound in an amount of less than 4 parts by mass tends to fail to sufficiently improve flex crack growth resistance, durability, and fuel economy. The amount of the silane compound is preferably 16 parts by mass or less, and more preferably 12 parts by mass or less. The silane compound in an amount of more than 16 parts by mass tends to only unnecessarily increase the cost and also tends to potentially decrease durability.

In the case where ENR is used in the rubber composition of the present invention, an alkaline fatty acid metal salt (fatty acid metal salt that forms an alkaline solution in water) may be added. The alkaline fatty acid metal salt neutralizes an acid that is used in the synthesis of ENR, thereby preventing ENR from being degraded by heat during kneading and vulcanization. It can also prevent reversion.

Examples of the metal of the alkaline fatty acid metal salt include sodium, potassium, calcium, and barium. Among these, calcium and barium are preferred for their greater effect on improving heat resistance and for compatibility with epoxidized natural rubber. Specific examples of the alkaline fatty acid metal salt include metallic stearates such as sodium stearate, magnesium stearate, calcium stearate, and barium stearate; and metallic oleates such as sodium oleate, magnesium oleate, calcium oleate, and barium oleate. Among these, calcium stearate and calcium oleate are preferred for their greater effect on improving heat resistance, higher compatibility with epoxidized natural rubber, and relatively low cost.

The amount of the alkaline fatty acid metal salt, per 100 parts by mass of ENR, is preferably 1 part by mass or more, more preferably 1.5 parts by mass or more, still more preferably 3 parts by mass or more, and particularly preferably 4.5 parts by mass or more. An amount of less than 1 part by mass is less likely to provide sufficient effects on heat resistance and reversion resistance. The amount of the alkaline fatty acid metal salt is preferably 10 parts by mass or less, and more preferably 8 parts by mass or less. An amount of more than 10 parts by mass tends to deteriorate tensile strength and durability.

In addition to the above-described components, compounding ingredients commonly used in production of rubber compositions may appropriately be added to the rubber composition of the present invention. Examples of such compounding ingredients include reinforcing fillers such as clay, zinc oxide, stearic acid, various antioxidants, tackifiers, wax, vulcanizing agents such as sulfur, and vulcanization accelerators.

The rubber composition of the present invention preferably contains a vulcanization accelerator. Examples of vulcanization accelerators include sulfenamide, thiazole, thiuram, thiourea, guanidine, dithiocarbamate, aldehyde-amine or aldehyde-ammonia, imidazoline, and xanthate vulcanization accelerators. These vulcanization accelerators may be used alone or in combinations of two or more. Among these, sulfenamide vulcanization accelerators are preferred because the effects of the present invention can be more suitably achieved.

Examples of sulfenamide vulcanization accelerators include N-tert-butyl-2-benzothiazolylsulfenamide (TBBS), N-cyclohexyl-2-benzothiazolylsulfenamide (CBS), and N,N-dicyclohexyl-2-benzothiazolylsulfenamide (DCBS). Among these, TBBS is preferred because the effects of the present invention can be more suitably achieved.

The amount of the vulcanization accelerator, per 100 parts by mass of the rubber component, is preferably 0.3 parts by mass or more, and more preferably 0.5 parts by mass or more, whereas it is preferably 5 parts by mass or less, and more preferably 3 parts by mass or less. The effects of the present invention can be more suitably achieved with the vulcanization accelerator in an amount in that range.

The rubber composition of the present invention can be prepared by any known method. For example, the rubber composition can be prepared by a method including: a base kneading step in which the components except the sulfur and the vulcanization accelerator are kneaded using a rubber kneader such as an open roll mill or Banbury mixer; a final kneading step in which the kneaded mixture obtained in the above step, the sulfur, and the vulcanization accelerator are kneaded; and a vulcanizing step. In particular, in the case of using a combination of NR and ENR as the rubber component, the base kneading step preferably includes: a first base kneading step in which NR and filler such as silica and carbon black are kneaded; and a second base kneading step in which the kneaded mixture obtained in the first base kneading step, ENR, a glycerol fatty acid triester, an alkaline fatty acid metal salt, and other components are kneaded. This method enables the silica to be easily dispersed in NR in a favorable manner, and also enables the glycerol fatty acid triester to be easily incorporated into ENR, thereby softening the ENR phase (island phase) so that flex crack growth resistance and crack initiation resistance can be further improved. Therefore, such a method enables the preparation of a rubber composition that exhibits the effects of the present invention in a more favorable manner.

The rubber composition of the present invention can be suitably used in sidewalls and base treads of tires.

A base tread is an inner layer portion of a tread having a multi-layered structure. For example, in the case of a tread having a two-layer structure (an outer surface layer (cap tread) and an inner surface layer (base tread)), the base tread refers to the inner surface layer.

The pneumatic tire of the present invention can be produced by an ordinary method using the rubber composition described above.

Specifically, an unvulcanized rubber composition containing the above-described components is extruded and processed according to the shape of a sidewall and/or of a base tread; and molded together with other tire components by an ordinary method using a tire building machine to form an unvulcanized tire. The unvulcanized tire is then heated and pressed in a vulcanizer into a tire.

The pneumatic tire of the present invention can be suitably used as an eco-friendly tire (eco tire) in various applications such as passenger cars, trucks, buses, and heavy vehicles.

EXAMPLES

The present invention is now specifically described referring to examples but is not limited to these examples.

The chemicals used in the preparations are listed below. The chemicals were purified by an ordinary method, if needed.

Myrcene: myrcene available from Wako Pure Chemical Industries, Ltd. (myrcene derived from natural resources)

Cyclohexane: cyclohexane (special grade) available from Kanto Chemical Co., Inc.

Neodymium (III) 2-ethylhexanoate: neodymium (III) 2-ethylhexanoate available from Wako Pure Chemical Industries, Ltd.

PMAO: PMAO available from Tosoh Finechem Corporation

Diisobutylaluminium hydride: diisobutylaluminium hydride available from Tokyo Chemical Industry Co., Ltd.

Diethylaluminum chloride: diethylaluminum chloride available from Tokyo Chemical Industry Co., Ltd.

Hexane: normal hexane (special grade) available from Kanto Chemical Co., Inc.

Dibutylhydroxytoluene: dibutylhydroxytoluene available from Tokyo Chemical Industry Co., Ltd.

Isopropanol: isopropanol (special grade) available from Kanto Chemical Co., Inc.

Butadiene: 1,3-butadiene available from Takachiho Chemical Industrial Co., Ltd.

<Preparation of Catalyst Solution (1)>

A nitrogen-purged, 50 mL-glass vessel was charged with 8 mL of a cyclohexane solution of myrcene (2.0 mol/L), 1 mL of a neodymium (III) 2-ethylhexanoate/cyclohexane solution (0.2 mol/L), and 8 mL of PMAO (Al: 6.8% by mass), and the mixture was stirred. After five minutes, 5 mL of a 1 M diisobutylaluminium hydride/hexane solution was added thereto. After another five minutes, 2 mL of a 1 M diethylaluminum chloride/hexane solution was added, and the mixture was stirred to obtain catalyst solution (1).

<Preparation 1 (Synthesis of Myrcene Polymer 1)>

A nitrogen-purged, 3 L-stainless steel pressure-resistant vessel was charged with 1800 mL of cyclohexane and 100 g of myrcene, and the mixture was stirred for 10 minutes. Subsequently, 120 mL of catalyst solution (1) was added thereto, and the resulting mixture was stirred at a constant temperature of 30° C. After three hours, 10 mL of a 0.01 M BHT (dibutylhydroxytoluene)/isopropanol solution was added dropwise thereto to terminate the reaction. The reaction solution was cooled and then added to 3 L of methanol that had been separately prepared. The thus obtained precipitate was air dried overnight, and then further dried under reduced pressure for two days, thereby obtaining 100 g of myrcene polymer 1. The polymerization conversion rate ("dry weight/weight of materials charged" in percentage) was nearly 100%.

<Preparation 2 (Synthesis of Myrcene Polymer 2)>

Myrcene polymer 2 in an amount of 100 g was obtained by the same procedure as described in Preparation 1, except that the amount of catalyst solution (1) was changed to 6 mL.

<Preparation 3 (Synthesis of Myrcene Polymer 3)>

Myrcene polymer 3 in an amount of 100 g was obtained by the same procedure as described in Preparation 1, except that the amount of catalyst solution (1) was changed to 0.3 mL.

<Preparation 4 (Synthesis of Myrcene Polymer 4)>

Myrcene polymer 4 in an amount of 100 g was obtained by the same procedure as described in Preparation 1, except that the amount of catalyst solution (1) was changed to 0.09 mL.

The obtained myrcene polymers 1 to 4 were evaluated as follows.

(Measurement of Weight Average Molecular Weight (Mw))

The Mw was determined from a value measured using a gel permeation chromatograph (GPC) (GPC-8000 series available from Tosoh Corporation; detector: differential refractometer; column: TSKGEL SUPERMULTIPORE HZ-M available from Tosoh Corporation), relative to polystyrene standards.

The chemicals used in the examples and the comparative examples are listed below.

NR: RSS #3

BR: BR150B (cis content: 97% by mass; $ML_{1+4}$ (100° C.): 40; viscosity of 5% toluene solution at 25° C.: 48 cps; Mw/Mn: 3.3) available from Ube Industries, Ltd.

ENR: ENR-25 (degree of epoxidation, 25 mol %; Tg: −47° C.) available from MRB in Malaysia Silica: Ultrasil VN3 ($N_2SA$: 175 $m^2/g$) available from Evonik Degussa Carbon black: DIABLACK E (N550; $N_2SA$: 41 $m^2/g$) available from Mitsubishi Chemical Corporation Silane coupling agent: Si69 (bis(3-triethoxysilylpropyl) tetrasulfide) available from Evonik Degussa Silane compound: KBE103 (phenyltriethoxysilane) available from Shin-Etsu Chemical Co., Ltd.

Aromatic oil: Process X-140 available from Japan Energy Corporation

Petroleum resin: SP1068 resin (C9 resin) available from NIPPON SHOKUBAI Co., Ltd.

Myrcene polymer 1: myrcene polymer formed from myrcene derived from natural resources in Preparation 1 (softener derived from non-petroleum resources, weight average molecular weight: 500)

Myrcene polymer 2: myrcene polymer formed from myrcene derived from natural resources in Preparation 2 (softener derived from non-petroleum resources, weight average molecular weight: 10,000)

Myrcene polymer 3: myrcene polymer formed from myrcene derived from natural resources in Preparation 3 (softener derived from non-petroleum resources, weight average molecular weight: 200,000)

Myrcene polymer 4: myrcene polymer formed from myrcene derived from natural resources in Preparation 4 (softener derived from non-petroleum resources, weight average molecular weight: 650,000)

Stearic acid: "Tsubaki" available from NOF Corporation

Zinc oxide: zinc oxide #2 available from Mitsui Mining & Smelting Co., Ltd.

Antioxidant: Nocrac 6C (N-(1,3-dimethylbutyl)-N'-phenyl-p-phenylenediamine) available from Ouchi Shinko Chemical Industrial Co., Ltd.

Wax: Ozoace 0355 available from Nippon Seiro Co., Ltd.

Sulfur: powdered sulfur available from Tsurumi Chemical Industry Co., Ltd.

Vulcanization accelerator: Nocceler NS (N-tert-butyl-2-benzothiazolylsulfenamide) available from Ouchi Shinko Chemical Industrial Co., Ltd.

The chemicals in the amounts shown in Step 1 of Table 1 were introduced and kneaded in a Banbury mixer for five minutes so as to give a discharge temperature of about 150° C. The kneaded mixture was then discharged (base kneading step).

Further, to the obtained kneaded mixture were added the sulfur and the vulcanization accelerator in the amounts shown in Step 2 of Table 1. The mixture was kneaded in the Banbury mixer for about 3 minutes so as to give a discharge temperature of 100° C., thereby obtaining an unvulcanized rubber composition (final kneading step).

The obtained unvulcanized rubber composition was formed into the shapes of a sidewall and a base tread, and they are assembled with other tire components. The assembly was vulcanized at 160° C. for 20 minutes to prepare a test tire (tire size: 195/65R15). In addition, the obtained unvulcanized rubber composition was vulcanized at 160° C. for 20 minutes to prepare a vulcanized rubber composition.

The thus obtained vulcanized rubber compositions and test tires were evaluated as follows. Table 1 shows the results. The formulation of Comparative Example 4 was used as the reference formulation in Table 1.

(De Mattia Flex Crack Growth Resistance Test)

In accordance with JIS K6260 "Rubber, vulcanized or thermoplastic—Determination of flex cracking and crack growth (De Mattia type)," a sample of the vulcanized rubber composition was tested at a temperature of 23° C. and a relative humidity of 55% to determine the crack length after one million test cycles or the number of test cycles until a crack grew to 1 mm. The number of test cycles or the crack length determined as above was used to determine the common logarithm of the number of flexing cycles until a crack grew to 1 mm on the sample of the vulcanized rubber composition, which was then expressed as an index relative to that of the reference formulation (=100) as shown below. The percentages 70% and 110% each indicate an elongation rate relative to the original length of the sample of the vulcanized rubber composition. The higher the index of the common logarithm, the less likely the crack grows, and, in turn, the better the flex crack growth resistance.

(De Mattia flex crack growth resistance index (70%))=(the common logarithm of the number of flexing cycles until a crack grew to 1 mm, determined in each formulation)/(the common logarithm of the number of flexing cycles until a crack grew to 1 mm, determined in the reference formulation)×100

(De Mattia flex crack growth resistance index (110%))=(the common logarithm of the number of flexing cycles until a crack grew to 1 mm, determined in each formulation)/(the common logarithm of the number of flexing cycles until a crack grew to 1 mm, determined in the reference formulation)×100

(Constant Strain Fatigue Test (Crack Initiation Resistance))

No. 3 dumbbell-shaped samples (vulcanized rubber composition) without initial crack were subjected to a cyclic constant strain rate tensile test at a maximum strain of 50% and a frequency of 5 Hz. After ten million test cycles, broken samples were rated "C"; cracked or scratched samples were rated "B"; and samples without defects were rated "A".

(Durability Test)

A drum (outside diameter: 1.7 m) was used to apply a load to the produced test tire with a rim (15×6.00 JJ) at a load of 6.96 kN, an internal pressure of 150 kPa, and a speed of 80 km/h. The test tire was continuously run until a crack occurred between the sidewall portion and the tread portion, and the distance at which the crack occurred (crack initiation distance) was measured.

Then, the crack initiation distance of each formulation was expressed as an index (durability index) relative to that of the reference formulation (=100) based on the following equation. The higher the index, the better the durability. (Durability index)=(crack initiation distance of each formulation)/(crack initiation distance of reference formulation)×100

(Rolling Resistance Test)

A 2 mm×130 mm×130 mm rubber slab sheet (vulcanized rubber composition) was prepared, and test pieces were cut out from the sheet to measure the tan δ of each vulcanized rubber composition using a viscoelasticity spectrometer VES (available from Iwamoto Seisakusho Co., Ltd.) at a temperature of 50° C., an initial strain of 10%, a dynamic strain of 2%, and a frequency of 10 Hz. The results were expressed as indices (rolling resistance indices (indicator of fuel economy)) relative to that of the reference formulation (=100) based on the following equation. The lower the index, the lower the rolling resistance, and, in turn, the better the fuel economy. (Rolling resistance index)=(δ of each formulation)/(tan δ of reference formulation)×100

TABLE 1

| | | | Examples | | | | | | | | |
|---|---|---|---|---|---|---|---|---|---|---|---|
| | | | 1 | 2 | 3 | 4 | 5 | 6 | 7 | 8 | 9 |
| Composition (part(s) by mass) | Step 1 | NR | 40 | 40 | 40 | 40 | 40 | 40 | 40 | 40 | — |
| | | BR | 60 | 60 | 60 | 60 | 60 | 60 | 60 | 60 | 60 |
| | | ENR | — | — | — | — | — | — | — | — | 40 |
| | | Silica | — | — | — | 55 | 55 | 55 | 55 | 55 | 55 |
| | | Carbon black | 50 | 50 | 50 | — | — | — | — | — | — |
| | | Silane coupling agent | — | — | — | 4.4 | 4.4 | 4.4 | 4.4 | 4.4 | 4.4 |
| | | Silane compound | — | — | — | 4.4 | 4.4 | 4.4 | — | — | — |
| | | Aromatic oil | — | — | — | — | — | — | — | — | — |
| | | Petroleum resin | — | — | — | — | — | — | — | — | — |
| | | Myrcene polymer 1 | — | — | — | — | — | — | — | — | — |
| | | Myrcene polymer 2 | 8 | 4 | — | 8 | 4 | — | 8 | — | — |
| | | Myrcene polymer 3 | — | 4 | 8 | — | 4 | 8 | — | 8 | 8 |
| | | Myrcene polymer 4 | — | — | — | — | — | — | — | — | — |
| | | Stearic acid | 2.5 | 2.5 | 2.5 | 2.5 | 2.5 | 2.5 | 2.5 | 2.5 | 2.5 |
| | | Zinc oxide | 3 | 3 | 3 | 3 | 3 | 3 | 3 | 3 | 3 |
| | | Antioxidant | 2.4 | 2.4 | 2.4 | 2.4 | 2.4 | 2.4 | 2.4 | 2.4 | 2.4 |
| | | Wax | 1.2 | 1.2 | 1.2 | 1.2 | 1.2 | 1.2 | 1.2 | 1.2 | 1.2 |
| | Step 2 | Sulfur | 1.6 | 1.6 | 1.6 | 1.6 | 1.6 | 1.6 | 1.6 | 1.6 | 1.6 |
| | | Vulcanization accelerator | 1 | 1 | 1 | 1 | 1 | 1 | 1 | 1 | 1 |
| Evaluation results | De Mattia flex crack growth resistance index 70% | | 110 | 105 | 103 | 112 | 107 | 105 | 113 | 111 | 115 |
| | De Mattia flex crack growth resistance index 110% | | 106 | 103 | 101 | 109 | 105 | 102 | 110 | 109 | 117 |
| | Constant strain fatigue test | | A | A | A | A | A | A | A | A | A |
| | Durability index | | 200 | 180 | 175 | 185 | 180 | 175 | 170 | 165 | 172 |
| | Rolling resistance index | | 109 | 111 | 112 | 93 | 95 | 96 | 94 | 94 | 92 |

TABLE 1-continued

| | | | Comparative Examples | | | | | | | |
|---|---|---|---|---|---|---|---|---|---|---|
| | | | 1 | 2 | 3 | 4 | 5 | 6 | 7 | 8 |
| Composition (part(s) by mass) | Step 1 | NR | 40 | 40 | 40 | 40 | 40 | 40 | 40 | 40 |
| | | BR | 60 | 60 | 60 | 60 | 60 | 60 | 60 | 60 |
| | | ENR | — | — | — | — | — | — | — | — |
| | | Silica | — | — | — | 48 | 55 | 55 | 55 | 55 |
| | | Carbon black | 50 | 50 | 50 | — | — | — | — | — |
| | | Silane coupling agent | — | — | — | 3.84 | 4.4 | 4.4 | 4.4 | 4.4 |
| | | Silane compound | — | — | — | — | — | — | 4.4 | 4.4 |
| | | Aromatic oil | 5 | — | — | 5 | — | — | — | — |
| | | Petroleum resin | 3 | — | — | 3 | — | — | — | — |
| | | Myrcene polymer 1 | — | 8 | — | — | 8 | — | 8 | — |
| | | Myrcene polymer 2 | — | — | — | — | — | — | — | — |
| | | Myrcene polymer 3 | — | — | — | — | — | — | — | — |
| | | Myrcene polymer 4 | — | — | 8 | — | — | 8 | — | 8 |
| | | Stearic acid | 2.5 | 2.5 | 2.5 | 2.5 | 2.5 | 2.5 | 2.5 | 2.5 |
| | | Zinc oxide | 3 | 3 | 3 | 3 | 3 | 3 | 3 | 3 |
| | | Antioxidant | 2.4 | 2.4 | 2.4 | 2.4 | 2.4 | 2.4 | 2.4 | 2.4 |
| | | Wax | 1.2 | 1.2 | 1.2 | 1.2 | 1.2 | 1.2 | 1.2 | 1.2 |
| | Step 2 | Sulfur | 1.6 | 1.6 | 1.6 | 1.6 | 1.6 | 1.6 | 1.6 | 1.6 |
| | | Vulcanization accelerator | 1 | 1 | 1 | 1 | 1 | 1 | 1 | 1 |
| Evaluation results | De Mattia flex crack growth resistance index 70% | | 96 | 92 | 99 | 100 | 100 | 102 | 101 | 103 |
| | De Mattia flex crack growth resistance index 110% | | 98 | 94 | 99 | 100 | 100 | 95 | 102 | 94 |
| | Constant strain fatigue test | | A | A | B | B | B | B | B | B |
| | Durability index | | 170 | 160 | 155 | 100 | 145 | 140 | 160 | 155 |
| | Rolling resistance index | | 123 | 100 | 98 | 100 | 95 | 96 | 94 | 97 |

In the examples in which a myrcene polymer with a specific weight average molecular weight (a softener derived from non-petroleum resources) was added in a rubber composition whose rubber component included at least two kinds of diene rubbers including at least one kind of diene rubber selected from the group consisting of natural rubber (NR), epoxidized natural rubber (ENR), and butadiene rubber (BR), good flex crack growth resistance, crack initiation resistance, durability, and fuel economy were achieved despite the use of the softener derived from non-petroleum resources.

On the other hand, Comparative Example 1, in which an aromatic oil was used, showed slightly poor flex crack growth resistance and had slightly poor results in the evaluation of durability as the sidewall or base tread, compared to the examples. In addition, Comparative Example 1 showed poor fuel economy compared to its counterpart Examples 1 to 3. Moreover, since a petroleum oil and resin were used, Comparative Example 1 had a higher ratio of non-petroleum resources than the counterpart examples, and thus was incapable of making a sufficient contribution to environmental friendliness.

Comparative Example 4, in which silica was used instead of carbon black, showed better fuel economy and a higher ratio of non-petroleum resources than Comparative Example 1. However, Comparative Example 4 showed slightly inferior flex crack growth resistance and a substantially inferior durability index compared to its counterpart Examples 4 to 8 in which silica was used. Comparative Example 4 also showed slightly poor fuel economy compared to the counterpart examples in which silica was used. In addition, the results of the constant strain fatigue test (crack initiation resistance) were slightly poor in this comparative example.

In Comparative Examples 2, 5, and 7, a myrcene polymer having a weight average molecular weight below the specific range used in the present invention was used. Thus, these comparative examples showed slightly poor flex crack growth resistance and had slightly poor results in the constant strain fatigue test (crack initiation resistance), compared to the examples. These comparative examples also had inferior results in the evaluation of durability as the sidewall or base tread, compared to their counterpart examples. In addition, these comparative examples tended to show slightly inferior fuel economy compared to the counterpart examples.

In Comparative Examples 3, 6, and 8, a myrcene polymer having a weight average molecular weight above the specific range used in the present invention was used. Thus, these comparative examples showed slightly poor flex crack growth resistance compared to their counterpart examples. In addition, these comparative examples had slightly poor results in the constant strain fatigue test (crack initiation resistance), and also had inferior results in the evaluation of durability as the sidewall. Moreover, these comparative examples tended to show slightly inferior fuel economy.

The invention claimed is:

1. A rubber composition for a sidewall or base tread, comprising:

a rubber component comprising at least two kinds of diene rubbers; and a myrcene polymer, wherein the rubber component comprises at least one kind of diene rubber selected from the group consisting of natural rubber, epoxidized natural rubber, and butadiene rubber, and the myrcene polymer has a weight average molecular weight of 1000 to 500000.

2. The rubber composition for a sidewall or base tread according to claim 1, wherein a combined amount of natural rubber and butadiene rubber is 50% by mass or more based on 100% by mass of the rubber component.

3. The rubber composition for a sidewall or base tread according to claim 1, wherein a combined amount of natural rubber and epoxidized natural rubber is 30% by mass or more based on 100% by mass of the rubber component.

4. The rubber composition for a sidewall or base tread according to claim 1, wherein an amount of total softener including the myrcene polymer is 1 to 30 parts by mass per 100 parts by mass of the rubber component.

5. A pneumatic tire, comprising at least one of a sidewall and a base tread which are formed from the rubber composition according to claim 1.

* * * * *